United States Patent [19]

Laiho

[11] Patent Number: 5,053,141

[45] Date of Patent: Oct. 1, 1991

[54] PROCEDURE AND MEANS FOR FILTERING, CLEANING AND HOMOGENIZING LIQUID SUBSTANCES USING ULTRASONICS

[76] Inventor: Kari U. Laiho, Rämpsälänkatu 13, SF-21110 Naantali, Finland

[21] Appl. No.: 382,639

[22] PCT Filed: Dec. 1, 1988

[86] PCT No.: PCT/FI88/00193

§ 371 Date: Jul. 19, 1989

§ 102(e) Date: Jul. 19, 1989

[87] PCT Pub. No.: WO89/05184

PCT Pub. Date: Jun. 15, 1989

[30] Foreign Application Priority Data

Dec. 2, 1987 [FI] Finland ................................ 875330

[51] Int. Cl.⁵ .............................................. C02F 1/36
[52] U.S. Cl. ..................... 210/739; 210/106; 210/110; 210/139; 210/388; 210/408; 210/741; 210/742; 210/785; 210/797
[58] Field of Search ............... 210/103, 105, 106, 110, 210/123, 332, 384, 388, 408, 741, 742, 748, 785, 791, 797, 138, 139, 143, 409, 243, 109, 117, 739

[56] References Cited

U.S. PATENT DOCUMENTS 3,478,883  11/1969  Deluca ................................ 210/388
4,282,100  8/1981  Kunishio et al. ................... 210/384

FOREIGN PATENT DOCUMENTS 42919    1/1982   European Pat. Off. ............ 210/748
1442610  4/1969   Fed. Rep. of Germany ...... 210/784
2427053  1/1975   Fed. Rep. of Germany ...... 210/384
2449817  4/1975   Fed. Rep. of Germany ...... 210/384
60-190208  9/1985  Japan .................................. 210/797
62-273015  11/1987  Japan ................................ 210/384
7900884  11/1979  PCT Int'l Appl. ................. 210/785
789132   12/1980  U.S.S.R. ............................. 210/106
812315   3/1981   U.S.S.R. ............................. 210/797
829141   5/1981   U.S.S.R. ............................. 210/106
865819   9/1981   U.S.S.R. ............................. 210/388

Primary Examiner—Robert A. Dawson
Assistant Examiner—Joseph Drodge
Attorney, Agent, or Firm—Kane, Dalsimer, Sullivan, Kurucz, Levy, Eisele and Richard

[57] ABSTRACT

A procedure and means for filtering and homogenizing liquid substances and for automatic cleaning of the filters. In the procedure are utilized an ultrasonic generator (4) connected in conjunction with the filter unit (1; 2) and ultrasonic oscillators (1.11; 2.11) thereto connected, their power and frequency being controlled on the basis of the differential pressure present across the filter units (1; 2), the liquid pressure acting in the filter unit, the liquid flow rate, signals from liquid temperature pick-ups. In order to enhance the cleaning event of the filter elements (1.2; 2.2) taking place with ultrasonics, the filter unit (1; 2) is emptied during the cleaning phase, making use of compressed air conducted into the filter. In order to facilitate the liquid filtering event and to reduce the need of cleaning action with ultrasonics, during normal filtering an ultrasonic power is maintained which is sufficient for homogenizing the liquid. The filter unit (1; 2) furthermore contains one or several cylindrical filter elements (1.2; 2,2).

20 Claims, 1 Drawing Sheet

PROCEDURE AND MEANS FOR FILTERING, CLEANING AND HOMOGENIZING LIQUID SUBSTANCES USING ULTRASONICS

The present invention concerns a procedure an a means for automatic filtering of liquid substances with a self-cleaning arrangement and possibly simultaneous homogenizing of the liquid that is being filtered. The procedure and means are based on using filter mesh elements, ultrasonics and compressed air.

In a liquid filtering event in which the liquid is passed through filter elements, the elements are soiled down and have to be replaced or cleaned. Since filter element replacing entails many detriments, e.g. the need to keep such elements in stock, the work involved in the replacement operation and possibly interruption of the filtering process, endeavours are generally aimed at performing doing the cleaning during operation if possible.

In the case of oils, for instance, cleaning during operation is usually implemented by conducting part of the flow which is being filtered back in reversed direction in an endeavour to achieve that the woven mesh, which is the type most often employed, will be flushed clean by the filtered liquid itself.

In the foregoing those natural drawbacks have already been described which arise from filter element replacing. The above-mentioned cleaning method during operation, based on reverse flow, also entails a number of drawbacks: the filters mesh fails to be completely cleaned in such a procedure. Secondly, the mesh may suffer damage from the pressure peaks induced by fuel supply pumps. Thirdly, when the liquid quantity required for reverse flushing is large, loss of time is incurred, and unnecessary twice-over purifying of the respective liquid quantity.

With the aid of the means of the invention quite significant improvement is achieved regarding the drawbacks mentioned, among others.

The most important advantages of the invention over other cleaning processes which take place during operation are to be seen in that by the procedure of the invention the filter elements will be more completely cleaned, the risk of damaging the filter mesh is prevented and reciprocating running of liquid is avoided.

The advantages gained as regards replacement of filter elements are obviously the same as those of cleaning during operation, which have already been discussed.

The invention is described in the following, referring in detail to the drawing attached, presenting an embodiment example of the invention. The invention is in no way narrowly confined to the details of said example.

Figure 1A:
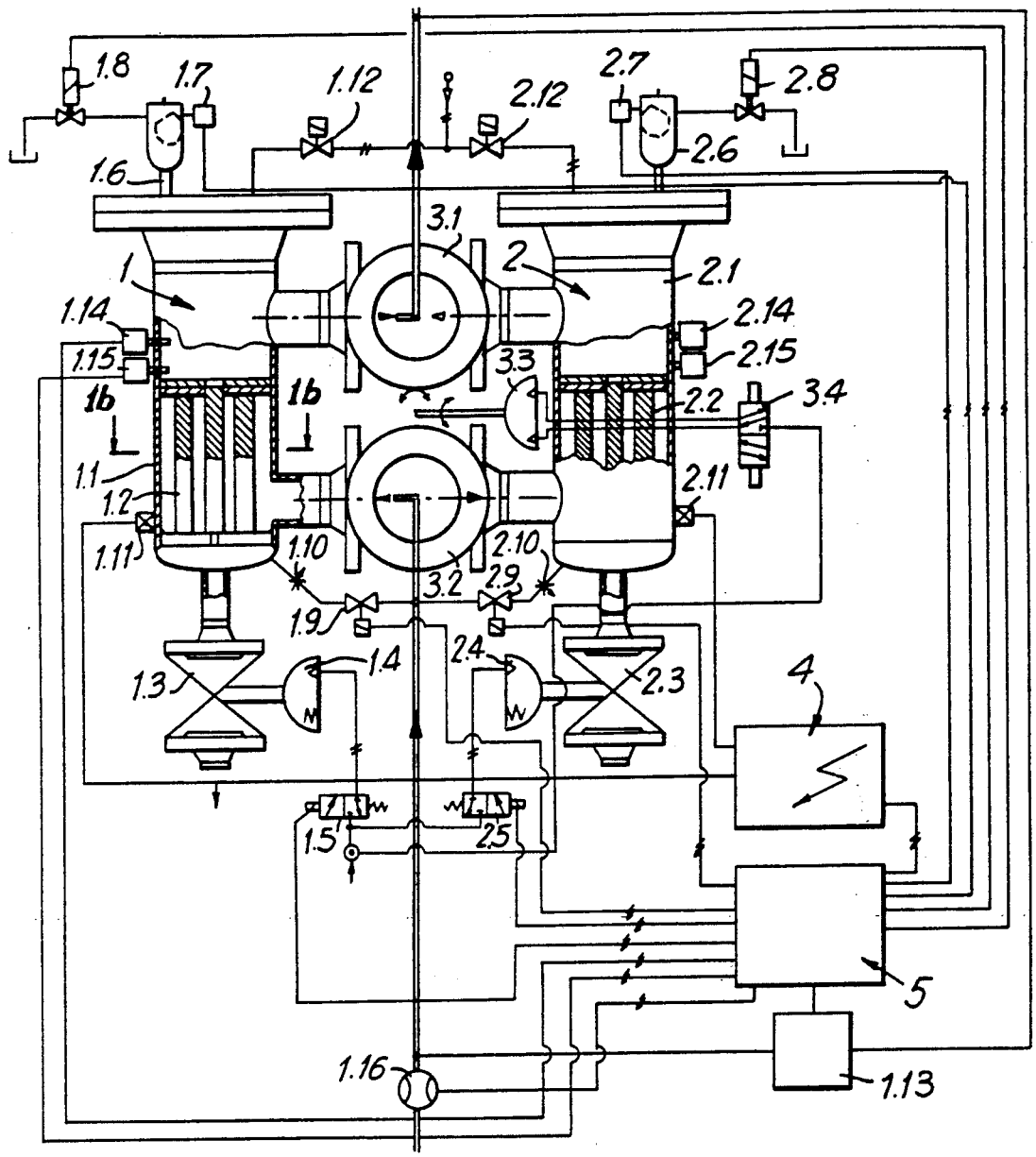
FIG. 1a is an overall view of the invention.

As depicted in FIG. 1a, the means comprises two identical filter units 1 and 2, these units being alternately one in use and the other in its cleaning cycle, or on conclusion of the cycle in readiness for use, and a switch-over valve assembly 3 with actuating mechanism, and an ultrasonic generator 4.

A filter unit is composed of a filter body 1.1, a filter element 1.2 which is exchangeable according to operating meed, a filtering residue removal valve 1.3, a single-action pneumatic actuator 1.4, a pilot valve 1.5, a float chamber 1.6 for air venting, a float-operated switch 1.7, a shut off valve 1.8, a filling valve 1.9, a restriction 1.10, an ultrasonic oscillator 1.11, a compressed air flushing valve 1.12, a differential pressure switch or differential, pressure pick-up 1.13 and a control unit 5.

Equivalent components of filter unit 2 can be similarly identified as identical components, using reference numerals 2.1 to 2.13, component 2.1 being the equivalent of component 1.1 in filter unit 1, and so on.

The switch-over valve assembly consists of a switch-over valve 3.1 for pure liquid, a switch-over valve 3.2 for impure liquid, a pneumatic actuating means 3.3 common to the foregoing components 3.1 and 3.2, and a pilot valve 3.4 for governing the component 3.3.

It is assumed in the example illustrating the operation of the means that filter unit 1 is operating, while unit 2 is standing by.

The degree of cleanness of the filter elements is monitored with a differential pressure switch, or pick-up, 1.13 installed across the incoming and outgoing pipelines, and to which may also be connected a differential pressure indicator means. When the differential pressure has reached a given, pre-set limit value, the valve 3.4 causes with the aid of the actuating means 3.3 the switch-over valves 3.1 and 3.2 to be positioned so that the liquid to be filtered will pass through the filter unit 2, which was in stand-by state heretofore.

During normal filtering, the ultrasonic head 1.11 (2.11) may be operated on low power in order to produce a slight cavitation phenomenon within the liquid to homogenize the liquid that is being filtered.

When the limit switch on the actuator of the switch-over valve actuator indicates that the liquid is passing through unit 2, unit 1 is switched to the cleaning cycle, the ultrasonic head 1.11 being now switched to receive power at a rate higher than the homogenizing power. The compressed air valve 1.12 opens and the pilot valve 1.5 causes the filtering residue elimination valve 1.3 to open, the size of valve 1.3 can be selected to obtain sufficient throttling, in order to drain the filter chamber within a desired period of time. When the chamber is filled to capacity, and when it is being emptied, the internal cavitation caused in the liquid by the ultrasonics causes efficient cleaning of the filter elements 1.2. In addition, the pressure of the liquid substance flowing through the filter may be varied to increase the effect of the ultrasonic cleaning.

After a pre-set, adjustable time, the ultrasonic generator is switched to lower power and the filter residue elimination valve 1.3 and the compressed air valve 1.12 are closed, whereafter valve 1.9 and valve 1.8 open. Liquid replenishment from the main liquid flow line flows through the restriction 1.10 into filter unit 1. Abrupt disturbances caused by lowered main flow pressure can be eliminated with the restricted flow.

Filling to capacity of the filter chamber is observed by then automatics, which close the valves 1.9 and 1.8 with the aid of the float-operated switch in the float chamber 1.6.

On conclusion of the sequence just described, filter unit 1 remains at stand-by.

When the differential pressure in filter unit 2 rises (due to soiling down) to the pre-set value, the above sequence is repeated, now in this latter unit. The liquid filtering and homogenizing procedure of the invention is mainly characterized in that the power output of the ultrasonic generator is controlled with a signal from the differential pressure switch or pick-up 1.13 connected across the filter units. This signal may be a limit value-actuated switch-on signal starting the above-described filter cleaning function, or it may be a continuous differential pressure signal from the differential pressure switch 1.13.

Since, as is well known, ultrasonics due to the cavitation which they cause have an attritive effect on materials, its power has to be optimized in relation to the interaction of ultrasonics promoting the filtering and liquid homogenizing action. The efficiency of ultrasonics in aiding liquid filtering and homogenizing is furthermore dependent on a number of factors, e.g. the pressure, temperature, viscosity and flow velocity of the liquid, the filter mesh size, and the frequency/frequency spectrum of the ultrasonics. Therefore the procedure of the invention for filtering and homogenizing liquids is also mainly characterized in that not only the power but also the frequency of the ultrasonics is controlled not only by said differential pressure switch or pick-up 1.13 but also by a liquid pressure pick-up 1.14, a temperature pick-up 1.15 or a liquid flow rate meter or pick-up 1.16 determining the flow going through the filter units.

Figure 1B:
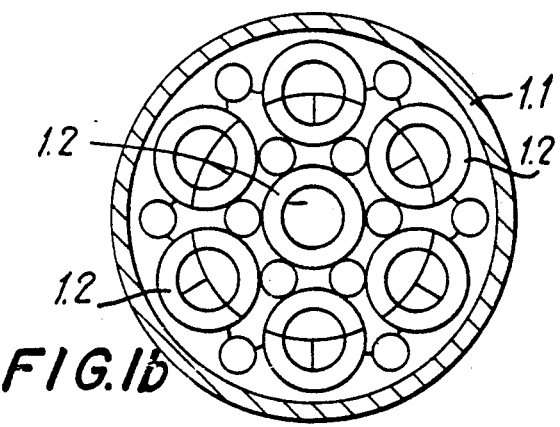
FIG. 1b is a detail thereof.

The procedure of the invention for filtering and homogenizing liquids is further characterized in that endeavours are made to maximize the filter area e.g. as shown in FIG. 16, which depicts a section view as indicated by the section 1b—1b in FIG. 1b, i.e., by disposing cylindrical filter cartridges in concentric circular configuration in the filter body 1.1, and on the outer circle so that ultrasonic cleaning applied in the filtering process might be needed at intervals as infrequent as possible.

If needed, various ancillaries promoting the action of the invention just described may be added, for instance a heating system to be connected to the jackets of the filter chambers, when implied by the particular liquids to be filtered and by the filtering conditions.

Even otherwise the invention is not confined to the exact configuration presented in the drawing or in the disclosure, and numerous modifications thereof are feasible, within the scope of the claims following below.

I claim:

1. A procedure for cleaning a filter unit automatically when filtering liquid substances and for simultaneously homogenizing and filtering liquid substances, by operating an ultrasonic oscillator and an ultrasonic generator, said ultrasonic oscillator and said ultrasonic generator being operated at a preselected power level during filtering which are switched to a higher power level required for cleaning the filter unit while a compressed air flushing valve is opened and a draining valve is opened, and in that said draining valve is adjusted to regulate a filter unit emptying time so that a desired cleaning time for the ultrasonic cleaning procedure may be effected.

2. Procedure according to claim 1, characterized in that after a pre-set adjustable period of time following the emptying of said filter unit said ultrasonic oscillator and said ultrasonic generator are switched to said preselected power level used during filtering said liquid substance, and the draining valve and the compressed air flushing valve are closed, whereafter a filling valve is opened to fill said filter unit with said liquid substance.

3. Procedure according to claim 1, characterized in that the ultrasonic oscillator is used to homogenize the substance that is being filtered.

4. Procedure according to claim 2 characterized in that the filling of the filter unit is stopped with a float-operated switch.

5. Procedure according to claim 1 one characterized in that the power level of the ultrasonic oscillator is controlled by the differential pressure present across the filter units.

6. Procedure according to claim 1 one characterized in that the power level of the ultrasonic oscillator is controlled by the flow rate of the liquid substance flowing through the filter unit.

7. Procedure according to claim 1, characterized in that the power level of the ultrasonic oscillator is controlled by the pressure of the liquid substance within the filter unit.

8. Procedure according to claim 1 characterized in that the power level of the ultrasonic oscillator is controlled by the temperature of the liquid substance flowing through the filter unit.

9. Procedure according to claim 1, characterized in that the pressure of the liquid substance flowing through the filter unit is varied to increase the effect of ultrasonic cleaning.

10. Procedure according to claim 1 wherein the frequency spectrum of the ultrasonic oscillator may be varied.

11. Means for filtering liquid substances and for cleaning a filter automatically, said means comprising a filter unit and a filter element, characterized in that the means further comprises an ultrasonic oscillator operatively connected with said filter unit; an ultrasonic generator for driving said ultrasonic oscillator; means responsive to filtering factors within said filter unit for raising the power level of said ultrasonic generator from a homogenizing level to a higher cleaning level; a compressed air flushing valve which is arranged to be opened to admit compressed air into said filter unit; means for opening said compressed air flushing valve; a draining valve which is arranged to be opened and adjusted to regulate a filter unit emptying time; and means for opening and adjusting said draining valve.;

12. Means according to claim 11, characterized in that said means further comprises means for lowering the power level of said ultrasonic generator after a pre-set period of time following the emptying of said filter unit; means for closing the draining valve;

means for closing the compressed air flushing valve;

a filling valve for filling said filter unit with said liquid substance; and means for opening said filling valve.

13. Means according to claim 12, characterized in that the means further comprises a float-operated switch to close the filling valves.

14. Means according to claim 11, characterized in that the ultrasonic generator is arranged to vibrate the ultrasonic oscillator during filtrating.

15. Means according to claim 11, characterized in that said means further comprises a differential pressure pick-up so that the power level of the ultrasonic oscillator may be controlled on the basis of the differential pressure present across the filter units.

16. Means according to claim 11, characterized in that said means further comprises a liquid flow rate meter so that the power level of the ultrasonic oscillators may be controlled on the basis of the flow rate of the liquid substance flowing through the filter unit.

17. Means according to claim 11, characterized in that said means further comprises a liquid pressure pick-up so that the power level of the ultrasonic oscillators may be controlled on the basis of the liquid pressure acting in the filter unit.

18. Means according to claim 11, characterized in that said means further comprises a temperature pick-up so that the power level of the ultrasonic oscillators may be controlled on the basis of the temperature of the liquid substance flowing through the filter unit.

19. Means according to claim 11, characterized in that said means further comprises at least one additional ultrasonic oscillator with a different frequency spectrum and power from another ultrasonic oscillator in said means.

20. Means according to claim 11, characterized in that within the filter unit are installed at least one cylindrical filter element parallel to the longitudinal axis of the filter unit.

* * * * *